Oct. 13, 1953   H. J. FEIBELMAN   2,654,929
SEPARABLE CONNECTOR FOR BRACELETS AND THE LIKE
Filed May 19, 1950

INVENTOR.
BY Hans J. Feibelman
Nathaniel Frucht
ATTORNEY

Patented Oct. 13, 1953

2,654,929

UNITED STATES PATENT OFFICE 2,654,929

SEPARABLE CONNECTOR FOR BRACELETS AND THE LIKE

Hans J. Feibelman, Providence, R. I.

Application May 19, 1950, Serial No. 163,066

2 Claims. (Cl. 24—201)

The present invention relates to jewelry, and has particular reference to a novel separable connection therefor of the magnetic type, such as shown in my copending application, Serial No. 163,065, filed May 19, 1950.

The principal object of the invention is to provide a magnetic type separable connection for jewelry items such as bracelets and the like.

Another object of the invention is to provide a magnetic type separable connection which is mechanically locked against accidental or inadvertent separation.

A further object of the invention is to provide a combination mechanical and magnetic type separable connection.

With the above and other objects and advantageous features in view, the invention consists of a novel arrangement of parts more fully disclosed in the detailed description following, in conjunction with the accompanying drawings, and more specifically defined in the claims appended thereto.

Figure 1:
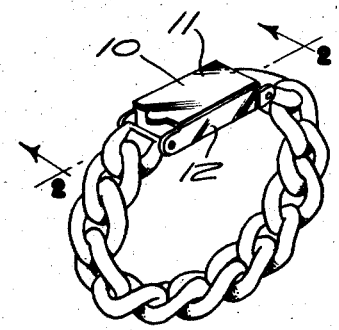
Fig. 1 is a perspective view of a bracelet equipped with the novel separable connection.
Figure 2:
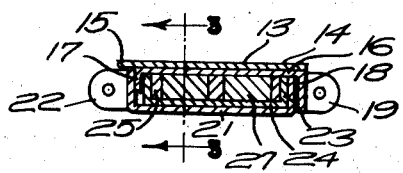
Fig. 2 is an enlarged section on the line 2—2 of Fig. 1.

It has been found desirable to provide a combination mechanical and magnetic separable connection for jewelry, whereby the magnetic elements and the mechanical parts cooperate together to provide a firm separable connection. To this end, I form one element of the connection with an outer casing in which I set a steel plate, this part having a tongue or flange; and I form the other element of the connection with a magnet assembly which cooperates with the steel plate of the first element to form a magnetic couple, the other element having a recess to removably receive the tongue or detent of the first element, whereby a combination mechanical and magnetic lock is provided.

Referring to the drawings, the separable end connection 10 includes an element 11 adapted to be connected to one end of a bracelet or the like, and an element 12 adapted to be connected to the other end of the bracelet. If the article is a two part brooch or other ornament, the element would be connected to the contacting portions of the parts thereof.

The element 11 is illustrated as comprising a non-magnetic outer shell 13 having an ornamental top 14, a finger tab 15, and a steel plate 16 which is soldered or otherwise secured to the inner surface of the top 14 and has a forward depending tongue or flange 17, the other end 18 being bent downwardly and having rearwardly directed pivot ears 19. The sides 20 of the plate 16 are of less width than the top 14 and are recessed from the edges of the top for a purpose hereinafter described.

Figure 3:
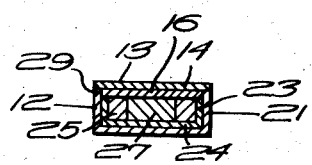
Fig. 3 is a section on the line 3—3 of Fig. 2.
Figure 4:
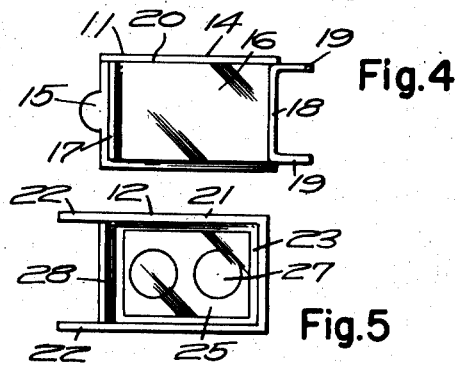
Fig. 4 is a bottom plan view of one end connection.
Figure 5:
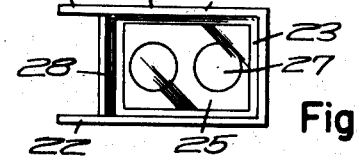
Fig. 5 is a top plan view of the associated end connection.
Figure 6:
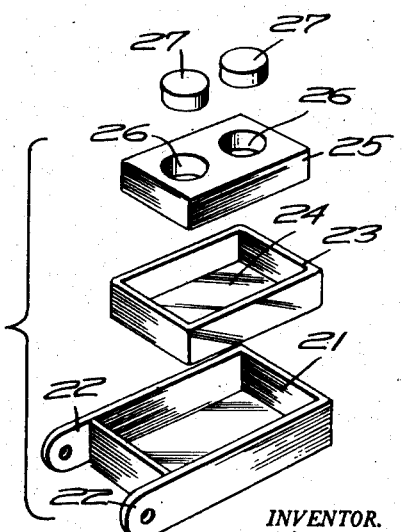
Fig. 6 is an exploded view of the parts of the end connection of Fig. 5.

The element 12 is of box type, with an outer non-magnetic shell 21 having forwardly extending pivot ears 22, an inner steel shell 23 having a steel bottom plate 24, a liner 25 of non-magnetic material such as brass, having a passage or passages 26, and a magnet or magnets 27 seated in the passage or passages 26 and contacting the steel shell 23, the steel bottom plate 24, the steel shell 23 being spaced from the end of the shell 21 to provide a recess 28. The sides of the shell 21 project above the liner 25 and its magnets 27 as shown in Fig. 3 to provide a seating recess 29 for receiving the plate 16.

When the steel plate 16 is set over the magnets 27 by inserting the tongue 17 in the recess 28, the magnets 27, shell 23, and plate 16 complete a magnetic circuit, the plate 16 and the magnet assembly forming a magnetic couple. The tongue 17 and the recess 28 provide a mechanical lock which cooperates with the magnetic couple to resist separating pull, whereby inadvertent separation is prevented, and the sides of the plate 16 telescopingly seat within the sides of the shell 21 to resist lateral strain. When it is desired to separate the connection, the finger tab 15 is lifted to break the magnetic circuit.

Although I have described a specific embodiment of my invention, it is obvious that changes in the size, shape and arrangement of the parts may be made to suit the requirements for different jewelry items, without departing from the spirit or the scope of the invention as defined in the appended claims.

I claim:

1. A separable connection for an article of jewelry comprising two elements, one element having a non-magnetic top, a steel plate fixed to said top and having its edges spaced from the edges of the top, the other element having a non-magnetic casing with upstanding walls adapted to seat over the top magnetic plate, and a magnetic part in said casing, said magnetic part including a steel shell in said casing, an insulating liner in said shell having a through passage and a magnet in said liner opening seated on said steel shell and adapted to contact the top steel plate, said first element having a downwardly extending tongue and said second element having a recess for receiving said tongue.

2. A separable connection for an article of jewelry comprising two elements, one element having a non-magnetic top, a steel plate fixed to said top and having its edges spaced from the edges of the top, the other element having a non-magnetic casing with upstanding walls adapted to seat over the top magnetic plate, and a magnetic part in said casing, said magnetic part including a steel shell in said casing, an insulating liner in said shell having a through passage and a magnet in said liner opening seated on said steel shell and adapted to contact the top steel plate, said first element having a downwardly extending tongue at one end and said second element having a recess between the steel shell and the casing for receiving said tongue.

HANS J. FEIBELMAN.

References Cited in the file of this patent

UNITED STATES PATENTS

| Number | Name | Date |
| --- | --- | --- |
| 577,850 | Goldsmith | Mar. 2, 1897 |
| 1,198,227 | Hinchey | Sept. 12, 1916 |
| 2,288,688 | Dubilier | July 7, 1942 |
| 2,389,298 | Ellis | Nov. 20, 1945 |
| 2,475,226 | Ellis | July 5, 1949 |
| 2,483,031 | Avedon | Sept. 27, 1949 |